United States Patent Office 2,951,812
Patented Sept. 6, 1960

2,951,812
DESICCANT AND METHOD OF MAKING

Vincent Q. Rapp, Erie, Pa., assignor to General Welding & Fabricating Co., Erie, Pa., a corporation of Pennsylvania No Drawing. Filed Aug. 11, 1958, Ser. No. 754,168

3 Claims. (Cl. 252—194)

This invention relates to a desiccant adapted for use in the form of a porous bed for drying air and other gases.

Calcium chloride is highly hydroscopic and is a well known drying or desiccating agent in spite of the fact that it is highly corrosive to metals and has other objectionable properties such as a tendency to cake when used in the form of a porous bed of granules for drying air and other gases.

Urea is hydroscopic but so far as I am aware has not been used alone as a drying agent.

I have found that a combination of calcium chloride and urea together with an alkali metal chromate such as sodium dichromate is an excellent drying agent.

In accordance with my invention I use urea in a granular crystalline form known as shotted urea and having an average particle size within the range from three sixty-fourths of an inch to one-sixteenth of an inch. In this form the urea particles are spherical or globular and have smooth surfaces so that the material flows freely and does not tend to cake and a mass thereof is freely permeable by gas.

The urea is put into an agitator or tumbler and sodium dichromate in powdered form is added. The amount of sodium dichromate added i.e. the ratio of sodium dichromate to urea may be varied within a substantial range e.g. from 0.5 to 5 parts by weight of the sodium dichromate per 100 parts by weight of the urea but I prefer to use about 2 parts by weight of the sodium dichromate per 100 parts by weight of the urea. After the addition of the sodium dichromate the mixture is agitated in contact with the air until the sodium dichromate is evenly distributed. This result is promoted by the absorption of moisture from the air. It appears that the moisture present, absorbed on the surfaces of the urea particles causes the sodium dichromate to dissolve and the resulting solution coats and penetrates into the urea particles until they are uniformly colored a yellow color and no particles of the sodium dichromate remain visible.

The time required for incorporating the sodium dichromate into the urea varies depending upon the fineness of the dichromate powder, the humidity of the atmosphere, temperature, size of batch, degree of agitation etc. For a batch of 100 pounds of urea and 2 pounds of sodium dichromate the mixing time generally is about 3½ minutes.

After the sodium dichromate has been incorporated with the urea as described above and while the mixture is still under agitation a strong solution of calcium chloride in water is added and the agitation is continued until the calcium chloride solution is uniformly distributed as a coating on the urea-dichromate granules. The quantity and concentration of the calcium chloride solution may vary within a substantial range. I prefer to add from 1 to 5 parts by weight of calcium chloride (calculated as anhydrous) per 100 parts by weight of the urea. The concentration of the calcium chloride may vary from say a 25% solution to a saturated solution. Depending upon the amount of calcium chloride to be added the concentration should be such as to give a sufficient volume of solution to coat the urea particles. In practice I have used 1 quart of a calcium chloride solution containing about 2 pounds of $CaCl_2$ per 100 pounds of the urea. The mixing time after the addition of the calcium chloride solution generally is about 1 minute. The mixture of urea, sodium dichromate and calcium chloride solution should not be held too long in contact with the atmosphere because it absorbs moisture very rapidly.

As soon as the mixing is complete the resulting moist, granular, free flowing yellow colored material is packaged in sealed containers such as tinned iron cans. It can be kept for a long time without caking and does not corrode the containers.

The desiccating material described above may be used in the form of a bed on a foraminous support. The gas e.g. air to be dried is passed through the bed. The material of the bed absorbs sufficient moisture to dissolve itself and in use the resulting solution of the material drips from the bottom of the bed and may be caught in a suitable container positioned below the bed. As the bed gradually dissolves away it may be maintained by suitable additions of fresh desiccant to the top of the bed. As stated no caking occurs and the bed remains freely permeable to the gas.

Urea absorbs heat as it dissolves in water so that the net heat effect of passing moist or humid air through a bed of the described desiccant is a slight but generally insignificant cooling. For efficient desiccation of moist or humid air i.e. to a dew point of about 0° F. the air should enter the desiccant bed at a temperature not higher than about 110° F. The dew point of air entering the bed at about 75° F. will be reduced to about —20° F. or lower if the capacity of the bed is not exceeded.

A preferred method of using the desiccant is to support a bed of it on a screen in a vertically disposed cylindrical tower. The air to be dried is introduced tangentially into the tower at a point below the bed and flows around and downwardly in a spiral passageway then upwardly through the bed and out of the tower at an outlet adjacent the top thereof. The spiral movement of the air at high velocity serves to separate dust particles and droplets of oil and/or water from the air before it reaches the desiccant bed.

By the use of the desiccant in a simple apparatus such as that described above air can be dried to a dew point of about —20° F. for about 1 mil per 1000 cubic feet at atmospheric pressure. 1 part by weight of the urea used absorbs about 1 part by weight of water at about 85° F. The urea plus the dichromate absorbs moisture better than urea alone. The combination will yield air having a dew point about 10° F. lower than urea alone. The combination of the urea, dichromate and calcium chloride yields air having a dew point about 30° F. lower than urea alone. Thus it is seen that small additions, of the order of 2%, of sodium dichromate and calcium chloride greatly enhances the utility of urea as a desiccant. As will be apparent from the foregoing the sodium dichromate acts not only as a corrosion inhibitor as is well known but also to increase the desiccant properties of the urea. It is not known precisely why this occurs.

The desiccant is useful in many situations such as those in which compressed air is used. When atmospheric air at a temperature of say 70° F. and having a normal moisture content, e.g. a relative humidity of say 50%, is compressed to say 100 pounds pressure per square inch and then cooled to a usable temperature of say 85° F. a considerable amount of water is precipitated and the air is brought to saturation with moisture i.e. 100% humidity. By passing such compressed and cooled air through a mechanical separation of the cyclone type described above and then through a bed of the desiccant it is freed of dust particles and its dew point may be lowered as stated above to −20° F. or lower.

If corrosion is not a consideration e.g. if the material with which the desiccant is to come in contact is glass the sodium dichromate ingredient of the composition may be omitted with only slight loss of efficiency of the remaining composition as a desiccant.

I claim:

1. A desiccant composition formed by mixing 100 parts by weight of granular urea with from 0.5 to 5 parts by weight of powdered sodium dichromate and then with from 1 to 5 parts by weight of calcium chloride in the form of a water solution thereof having a concentration of at least 25%.

2. A desiccant composition comprising 100 parts by weight of granular urea coated and impregnated with a substantially saturated aqueous solution of about 2 parts by weight of sodium dichromate and then with from 1 to 5 parts by weight of calcium chloride in the form of a water solution thereof having a concentration of at least 25%.

3. A method of making a desiccant which comprises mixing about 100 parts by weight of shotted urea granules with from 0.5 to 5 parts by weight of sodium dichromate in finely powdered form in humid air until the granules of urea are coated and impregnated with the sodium dichromate, adding from about 1 to about 5 parts by weight of calcium chloride in the form of a water solution thereof having a concentration of at least 25% and continuing the mixing until the resulting granular mixture is homogeneous.

References Cited in the file of this patent

UNITED STATES PATENTS

| | | |
|---|---|---|
| 1,041,608 | Edeleanu | Oct. 15, 1912 |
| 1,425,790 | Moyer | Aug. 15, 1922 |
| 1,482,626 | Whiting | Feb. 5, 1924 |
| 1,740,351 | Isobe | Dec. 17, 1929 |
| 1,798,862 | Baker | Mar. 31, 1931 |
| 2,686,741 | Farber | Aug. 17, 1954 |

FOREIGN PATENTS

| | | |
|---|---|---|
| 280,934 | Great Britain | Feb. 18, 1929 |
| 259,574 | Germany | Apr. 25, 1913 |

OTHER REFERENCES

Yoe: Chemical News, May 20, 1925, pp. 340–343.